United States Patent [19]

Hunter et al.

[11] 4,135,539
[45] Jan. 23, 1979

[54] SPEED CONTROL MEANS FOR CENTER PIVOT IRRIGATION SYSTEM

[75] Inventors: Edwin J. Hunter, Rancho Santa Fe; Richard E. Hunter, Carlsbad; Richard W. Cudworth, San Marcos, all of Calif.

[73] Assignee: The Toro Company, San Marcos, Calif.

[21] Appl. No.: 890,033

[22] Filed: Mar. 27, 1978

Related U.S. Application Data

[63] Continuation of Ser. No. 746,856.

[51] Int. Cl.$^2$ .............................................. B05B 3/12
[52] U.S. Cl. .................................... 137/1; 137/344; 239/177
[58] Field of Search ................... 137/1, 344; 239/177, 239/212, 213

[56] References Cited

U.S. PATENT DOCUMENTS

| | | | |
|---|---|---|---|
| 3,484,046 | 12/1969 | Harris | 239/177 |
| 3,558,257 | 1/1971 | Harris | 239/177 |
| 3,628,729 | 12/1971 | Thomas | 137/344 X |

Primary Examiner—Martin P. Schwadron
Assistant Examiner—Gerald A. Michalsky
Attorney, Agent, or Firm—Poms, Smith, Lande & Glenny

[57] ABSTRACT

A method and apparatus for operating a center pivot irrigation system including a plurality of span units, each having a drive carriage having a hydraulically driven motor means for operating associated carriage wheels in response to hydraulic fluid supplied thereto under pressure through hydraulic fluid lines from a source thereof, is operated by supplying hydraulic fluid at a selectable value of constant volume fluid flow to the system to drive the system at a selectable average speed about its center pivot, the flow rate of fluid to individual motor means of individual span units which are ahead or behind of a predetermined relative alignment with the other span units being varied in response to changes in angularity sensed between adjacent span units in both forward and backward directions relative to the direction of travel of the system about its center pivot while the constant volume fluid flow through the system is being maintained at a selectable constant flow rate. An improved hydraulic adjustable rate flow valve accommodates fluid flow in reversible directions while maintaining close control or metering capabilities over the fluid flow through the valve in either flow direction.

5 Claims, 13 Drawing Figures

SPEED CONTROL MEANS FOR CENTER PIVOT IRRIGATION SYSTEM

This is a continuation, of application Ser. No. 746,856, filed Dec. 2, 1976 now abandoned.

BACKGROUND OF THE INVENTION

The present invention relates in general to center pivot irrigation systems having a plurality of span units which are individually driven about the center pivot to irrigate a substantially circular area and more particularly to methods and apparatus for operating the system at a selectable average speed about the center pivot through hydraulic fluid drive means and methods and apparatus for controlling the distribution of the hydraulic fluid throughout the system in a manner to drive the units in a predetermined desired manner about the center pivot.

Various center pivot irrigation system have been developed heretofore wherein a plurality of water conduit sections are individually supported on self propelled carriages, individual conduit sections and carriages being interconnected with associated truss means to form an individual span unit with the individual units being interconnected in a substantially linear array extending from the center pivot out to an end span unit several hundred feet from the center pivot. Some of these prior center pivot irrigation systems have been driven through the use of hydraulic fluid systems operating hydraulically driven motor means associated with the individual span unit carriage wheels.

It has been the practice heretofore in prior hydraulically driven center pivot irrigation systems to maintain a relatively high system pressure supplied to each of the hydraulically driven motor means, such pressures being maintained generally through the use of a pressure compensation pump. The speed of the system about its center pivot has heretofore been controlled through the use of a flow control at the end span unit to attempt to run it at a given speed with the intermediate span units between the center pivot and end span unit having their fluid flow controlled in order to follow or keep up with the end span unit. These prior systems have not proven to be entirely satisfactory in that the high system pressures required require an expensive hydraulic fluid system and the means of speed control through attempted control of the end span unit with attendant follow-up control of the intermediate span units has not produced a fully satisfactory speed control for the system. In addition, when reversing the direction of travel of the system about the center pivot, it has been found that the lag of the intermediate units relative to the end span unit cannot be maintained as small as would be desirable and as might be attainable if the system were originally designed to go in one direction only about the center pivot.

It is therefore been recognized that there is a need for an improved method and apparatus for driving a center pivot irrigation system through hydraulic means to provide a better speed control about the center pivot and to reduce the lag of intermediate span units relative to the end unit while the system is traveling in either of two reversible directions about the center pivot.

SUMMARY OF THE INVENTION

It is therefore a primary object of the present invention to disclose and provide methods and apparatus for operating a center pivot irrigation system having a plurality of individually hydraulically driven span units wherein the hydraulic fluid drive for the system may operate at relatively low system pressures and run the center pivot irrigation system at a selectable average speed around the center pivot.

It is another object of the present invention to disclose and provide methods and apparatus for operating a center pivot irrigation system through hydraulic drive means in either of two rotative directions around the center pivot wherein the distribution of hydraulic fluid to individual motor means of the individual span units can be closely controlled and metered to reduce the lag of intermediate span units relative to a leading end span unit regardless of whether the system is being operated in either of the two rotative directions about the center pivot.

Generally stated, the method of operating a center pivot irrigation system having a plurality of span units, each including a drive carriage having a hydraulically driven motor means for operating associated carriage wheels in response to hydraulic fluid supplied thereto under pressure through hydraulic fluid lines from a source thereof, comprises a method of and an apparatus for supplying hydraulic fluid at a selectable value of constant volume fluid flow to the system to produce a selectable average speed for the system about the center pivot. The flow rate of fluid to motor means of individual span units intermediate the center pivot and end span unit are ahead or behind of a predetermined desired relationship with the other span units is varied and closely metered in accordance with the present method and apparatus to control the distribution of the hydraulic fluid between the units to vary the speed of travel of the individual units while the constant volume fluid flow to the overall system is maintained constant and the overall average speed of the system about the center pivot is maintained constant.

More specifically, changes in angularity between adjacent span units in both forward and backward directions relative to either direction of travel of the system about its center pivot are sensed and adjustable flow valves are operated in response to the changes in angularity sensed to modulate or turn off the supply of fluid to motor means of any span unit which is ahead or even with a position in alignment with its predetermined position of alignment and for turning on and increasing the flow rate of fluid to motor means of a span unit that lags behind its desired position relative to the other span units in an ever increasing amount as the amount of lag increases. Safety systems are provided in accordance with the present invention for turning off the supply of fluid to the end span unit motor means when any one span unit of the system lags more than a predetermined amount behind the others in order to allow the system to get back into a desired position of alignment before the end unit's hydraulic fluid supply is automatically turned back on. In the event any lagging span unit gets more than a second predetermined amount behind a position of desired alignment, means are provided for turning the entire system off.

According to the present method and apparatus for operating a center pivot irrigation system, the hydraulic fluid flow through the system may be reversed to operate the system in either of two directions about the center pivot. Adjustable valve means are provided in association with the carriage motor means of the intermediate span units which are capable of closely metering the flow of fluid through the valves in either flow direction to the associated motor means so that the speed control of the individual units can be closely controlled to narrow the amount of lag of the intermediate units relative to the end unit which is set to precede the intermediate units in the travel of the system in either rotative direction about the center pivot.

A more complete understanding of the present invention in method and apparatus for operating a center pivot irrigation system will be afforded to those skilled in the art from a consideration of the following detailed explanation of a preferred exemplary embodiment thereof. Reference will be made to the appended sheets of drawings which will be first briefly described.

DETAILED DESCRIPTION OF AN EXEMPLARY EMBODIMENT

Figure 1:
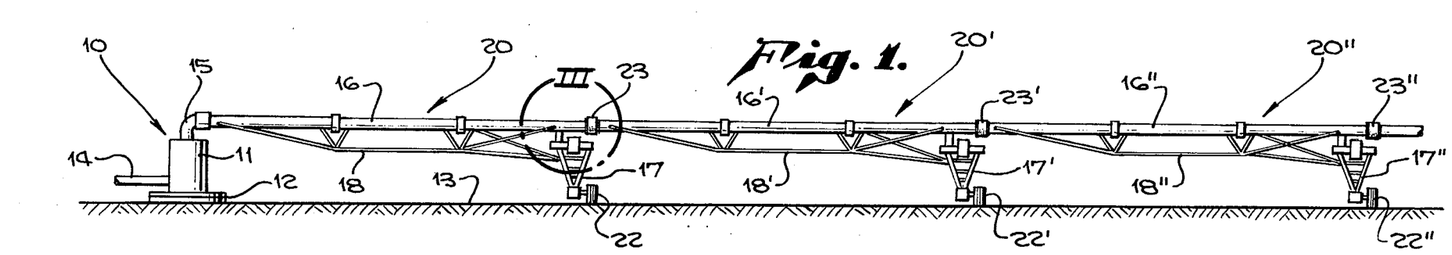
FIG. 1 is an elevation view of a portion of an exemplary center pivot sprinkler system in which a preferred exemplary embodiment of the present invention in method and apparatus for operating a center pivot sprinkler system by a constant volume hydraulic fluid drive employed.
Figure 2:
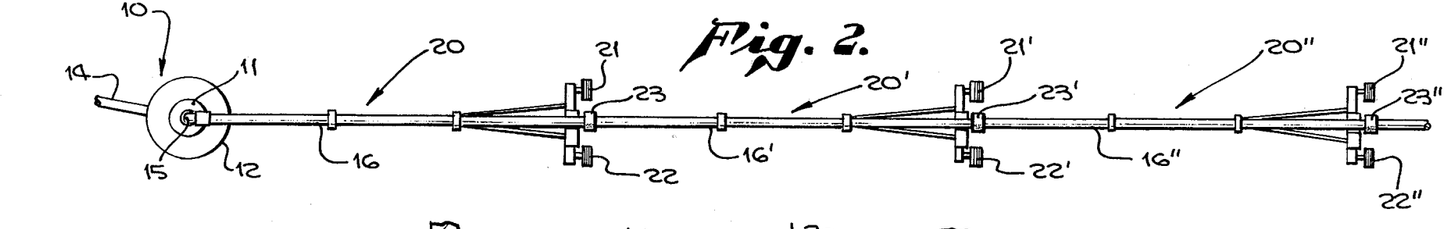
FIG. 2 is a plan view of the system of FIG. 1.

An exemplary embodiment of center pivot irrigation or sprinkler system in which the present method and apparatus for operating a center pivot irrigation system by a constant volume hydraulic fluid drive is illustrated in FIGS. 1 and 2. The system includes a center pivot, indicated generally at 10, comprising a housing 11 mounted on a stationary base seated upon a field 13 to be irrigated. Water is supplied via supply conduit 14 and is communicated through housing 11 to a pivotally mounted, rotating elbow conduit fitting 15 connected to the first conduit section 16 of the first span unit indicated generally at 20. The irrigation system comprises a plurality of individual span units, as 20, 20' and 20" illustrated, which are interconnected in a continuous linear array extending from the center pivot, indicated generally at 10, outwardly for several hundreds of feet to an end span unit (not shown) in known manner for operating center pivot sprinkler systems.

Each span unit mounts a water conduit, as 16, 16' and 16" in FIGS. 1 and 2, by means of a wheeled carriage, as carriages 17, 17' and 17" and associated truss means, as the trusses 18, 18' and 18", in known manner. Further, as seen in FIGS. 1 and 2, each carriage includes a pair of drive wheels, as wheels 21, 21', 21" and 22, 22' and 22". As will be discussed hereinafter in detail, each drive wheel is provided with motor means operated by hydraulic fluid as hereinafter explained.

Figure 3:
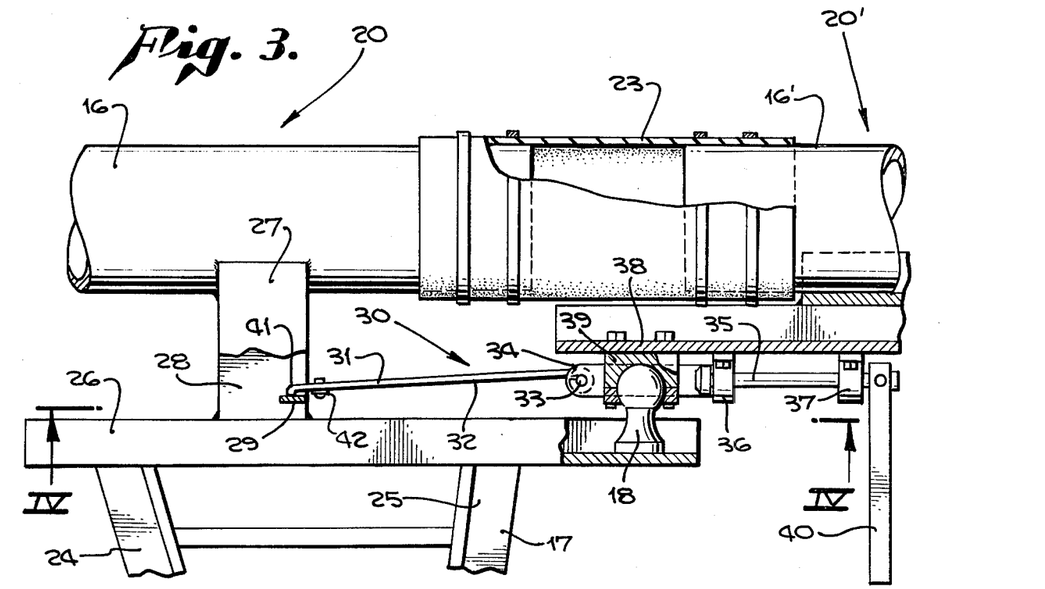
FIG. 3 is a detail view taken in FIG. 1 and showing an exemplary embodiment of angularity sensor means employed between adjacent span units of the center pivot sprinkler system.
Figures 4, 10:
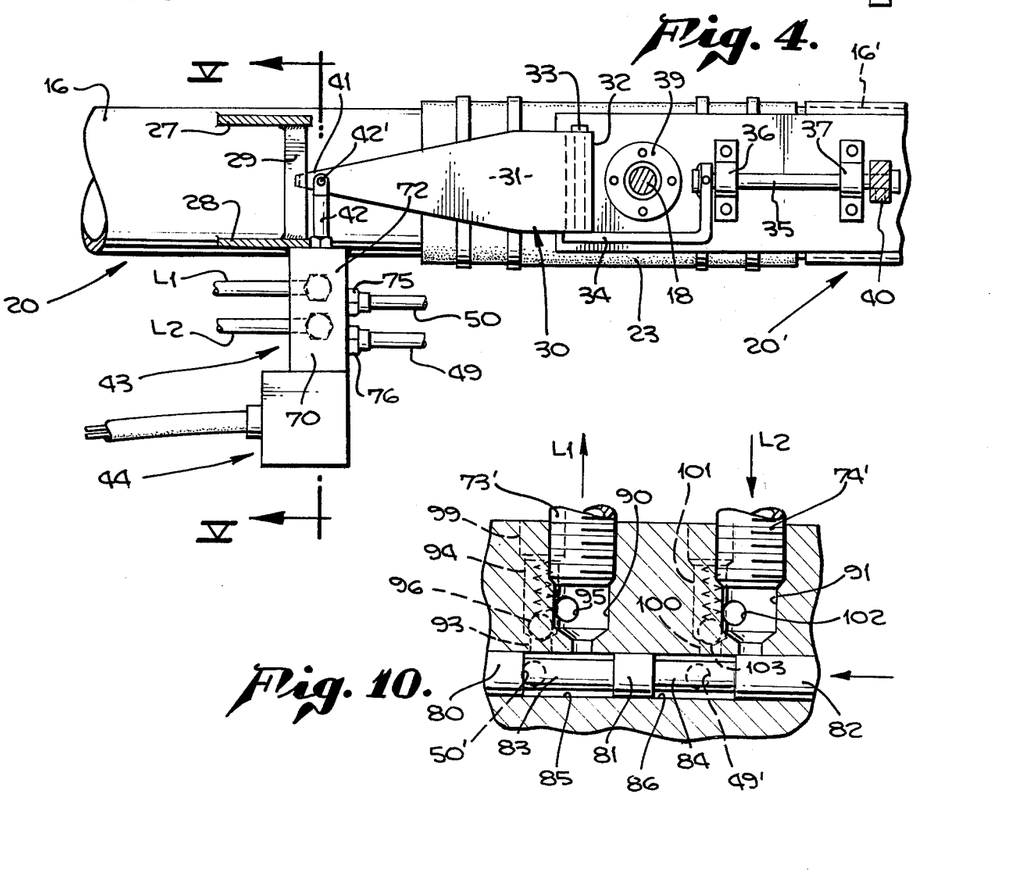
FIG. 4 is a bottom view, partially in section, of the sensor means of FIG. 3 taken therein along the plane IV—IV.
FIG. 10 is a view of the valve means of FIG. 9 showing the hydraulic fluid flow path reversed relative to that of FIGS. 5 and 9.

As can be seen from the foregoing, the first span unit is pivoted at the center pivot, indicated generally at 10 and is supported at its outer end by wheeled carriage 17. The successive span units, as 20' and 20", are in turn supported by a ball joint connection, as known in the art, on the preceding span units' carriage and are supported on their own outer ends by their associated drive carriage, as carriages 17' and 17" as seen in FIGS. 1 and 2. As we explain hereinafter, the individual span units are individually self-propelled by their associated hydraulic motor means and, according to the present method and apparatus, are controlled to remain in a generally linear alignment as the system rotates about its center pivot, indicated generally at 10. In order to maintain such alignment, the system includes angularity sensor means between adjacent span units for sensing changes in angularity between the adjacent units. A preferred exemplary embodiment in angularity sensor means is disclosed in the copending application for U.S. Letters Patent, Ser. No. 731,695 filed Oct. 12, 1976 in the name of Edwin J. Hunter entitled, "Angularity Sensor Means for Center Pivot Irrigation System", now Pat. No. 4,085,771, the disclosure of which is incorporated herein by this reference for showing such angularity sensor means suitable for use in the present exemplary embodiment of center pivot irrigation system. Portions of the angularity sensor means of said application, Ser. No. 731,695, now U.S. Pat. No. 4,085,771, are illustrated in FIGS. 3 and 4 of the within disclosure. As seen in FIG. 3, the exemplary carriage 17 includes a frame having vertical braces, as 24 and 25, supporting top braces, as brace 26 which in turn support the associated conduit 16 by standards 27 and 28 welded to the carriage and conduit 16 in suitable manner. Standards 27 and 28 are interconnected by a cross member 29 as seen in FIGS. 3 and 4.

Angularity sensor means, in the exemplary embodiment, are illustrated generally at 30 and comprise a control arm 31 pivotally mounted at a rear end 32 on an axle 33 which is maintained substantially horizontal by mounting member 34. As disclosed more fully in said copending application, Ser. No. 731,695, now U.S. Pat. No. 4,085,771, mounting member 34 is pivotally mounted to the adjacent span unit by axle 35 rotatably mounted in journals 36 and 37 secured to a structural member 38 mounting socket 39 which rests upon ball 18 provided on carriage 17. Control arm 31 is therefore free to pivot in a substantially vertical direction about its hinge axis 33 which is maintained in a substantially horizontal attitude by its mounting member 34 due to the action of pendulum weight 40 acting on axle 35. Changes in angularity between the adjacent span units, as units 20 and 20' will therefore cause arm 31 to move in a direction substantially perpendicular to the true vertical with its free end 41 sliding laterally across member 29 in either direction from the central aligned position of FIGS. 3 and 4, depending upon the direction in which such angularity change takes place. The movement of the outer end 41 of control arm 31 is transmitted by control rod 42 to an adjustable hydraulic fluid control valve means, indicated generally at 43 and an associated electrical switch means indicated generally at 44 as will be subsequently described.

Figures 11, 12:
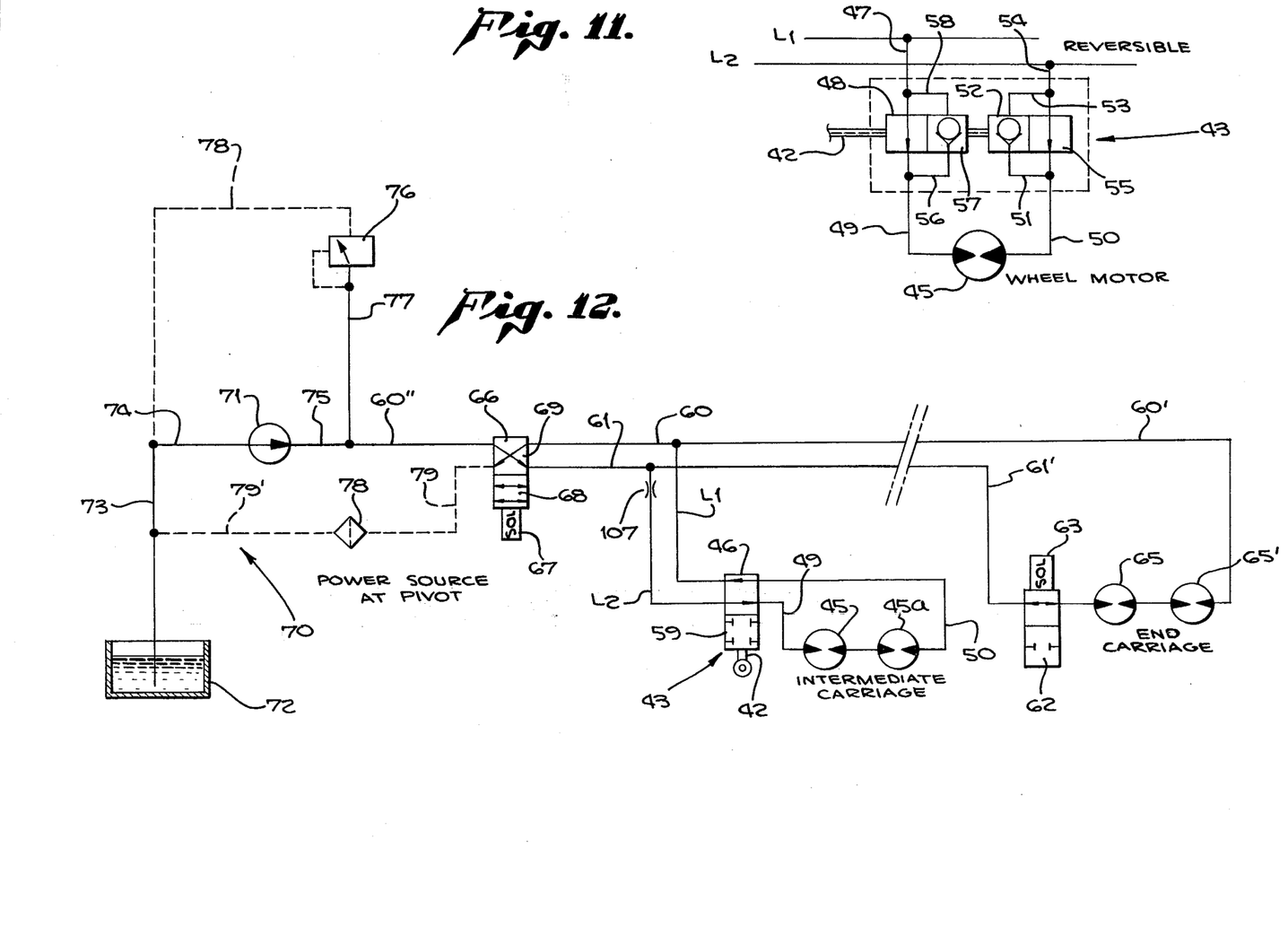
FIG. 11 is a schematic representation of the hydraulic fluid drive means for the hydraulic fluid motor means employed on the span unit carriages for driving the carriage wheels.
FIG. 12 is a schematic representation of the hydraulic fluid system for the exemplary embodiment.

Hydraulically driven motor means are provided in association with each of the wheels of the individual span unit carriages, as the wheels 21 and 22 of span unit 20. Such hydraulically-driven motor means are known in the art and any of the presently available motor means may be employed which are suitable for reverse drive in association with the hydraulic fluid system to be described hereinafter. Referring to FIG. 11, the motor means for an individual wheel, identified as "wheel motor" is represented at 45 in the schematical representation of the hydraulic system for the wheel of each of the aforesaid carriages. Hydraulic fluid is to be flowed in either direction through fluid lines L1 and L2 through valve means, indicated at 43 through the wheel motor 45. When fluid line L1 is a supply line, fluid flow passes through line 47, valve 48, line 49, motor 45, line 50, bypass line 51, check valve 52, line 53, and line 54 to the then exhaust line L2. On reversal of fluid flow in lines L1 and L2, fluid flow will then be through line 54, valve 55, line 50, motor 45, line 49, bypass line 56, check valve 57, line 58, and line 47 to the then exhaust line L1.

As seen in FIG. 12, each of the carriages 17, 17', 17" et seq. which are intermediate the center pivot, indicated generally at 10, and an end carriage are connected by fluid lines L1 and L2 to system hydraulic lines 60 and 61. As further contemplated within the present invention, and as illustrated schematically in FIG. 12, the intermediate carriages are provided with two drive wheels, each wheel having its hydraulically-driven motor 45 and 45a, respectively, connected in series type fluid communication between lines 49 and 50 hereinbefore described. Valve 43, as contemplated in the present invention accommodates the flow of fluid in either direction through lines L1 and L2, and contains means for closing off both lines, indicated at 59, upon suitable operation of control rod 42 by the associated angularity sensor means.

The carriage wheels for the end carriage, according to the present method and apparatus, have their associated hydraulically driven motor means at 65 and 65' connected in series in portions 60' and 61' of the main supply lines 60 and 61. An on-off valve 62 is provided in line portion 61' to turn the supply of hydraulic fluid to motor means 65 and 65' on or off in response to electrical operation of the associated solenoid 63 as hereinafter explained.

In the hydraulic fluid system of the present embodiment, means are provided for reversing the flow of fluid through the main lines 60 and 61 in order to reverse the direction of flow to the individual motor means and thus reverse the direction of rotation of the carriage drive wheels. As represented schematically in FIG. 12, a reversing valve means 66 is provided in lines 60 and 61 which may be manually or automatically as by an associated solenoid 67 in response to known electrical circuitry. Reversing valve 66, as is known per se, has a straight-through valving portion 68 and a reversing portion 69 which may be interchanged with respect to flow lines 60 and 61 through operation of the associated solenoid 67.

As particularly contemplated within the present invention in method and apparatus for operating a center pivot irrigation system, means are provided for supplying hydraulic fluid to the system mainlines 60 and 61 at a selectable value of constant volume fluid flow to provide a selectable average speed for the system around the center pivot indicated generally at 10. As contemplated within the present invention, a given volume of hydraulic fluid is pumped into the system for a given period of time to produce a net travel or rotation of the system about the center pivot, although individual span units will go faster or slower and fluid pressures at various motor means will be higher or lower depending upon the conditions of the terrain being traversed by the system. Hydraulic fluid pump means, are known per se, for supplying a constant volume of fluid flow at variable rates to hydraulic systems. Such pump means, in the exemplary embodiment are indicated generally at 70 and comprise a unidirection hydraulic fluid pump 71 suitable for supplying a selectable constant volume fluid flow from reservoir 72 via hydraulic lines at 73 and 74 and supplying it at selectable constant volume flow rate to line 75 connected into portion 60" of the main supply line 60. The exemplary hydraulic fluid pump means includes, as is known per se, a pressure relief valve indicated at 76 which is normally closed and is connected by line 77 to the output line 75 of pump 71. In the event that excessive pressure were to build up in lines 75 and 77, the pressure relief valve 76 will open to allow return of hydraulic fluid to return line 78 to reservoir 72. A return filter or separator means, known per se, is indicated at 78 in the return lines 79, 79' for the return of fluid from the fluid lines 60 or 61 to the reservoir 72 as seen in FIG. 12. According to the method and apparatus of the present invention, hydraulic fluid is pumped by pump 71 from reservoir 72 into the system of lines 60, 61, intermediate carriage lines L1 and L2 and the end carriage lines 60' and 61" at a variable or selectable value of constant volume fluid flow to produce an average speed for the system about the center pivot. As will be described hereinafter, if any particular span unit gets ahead or behind of its associated adjacent span units, its supply of hydraulic fluid is increased or decreased as is appropriate for bringing it back into the desired alignment. The fluid flow to each carriage's motor means, according to the present invention, is controlled in response to changes in angularity sensed by the aforedescribed angularity sensor means as explained hereinafter.

Figure 13:
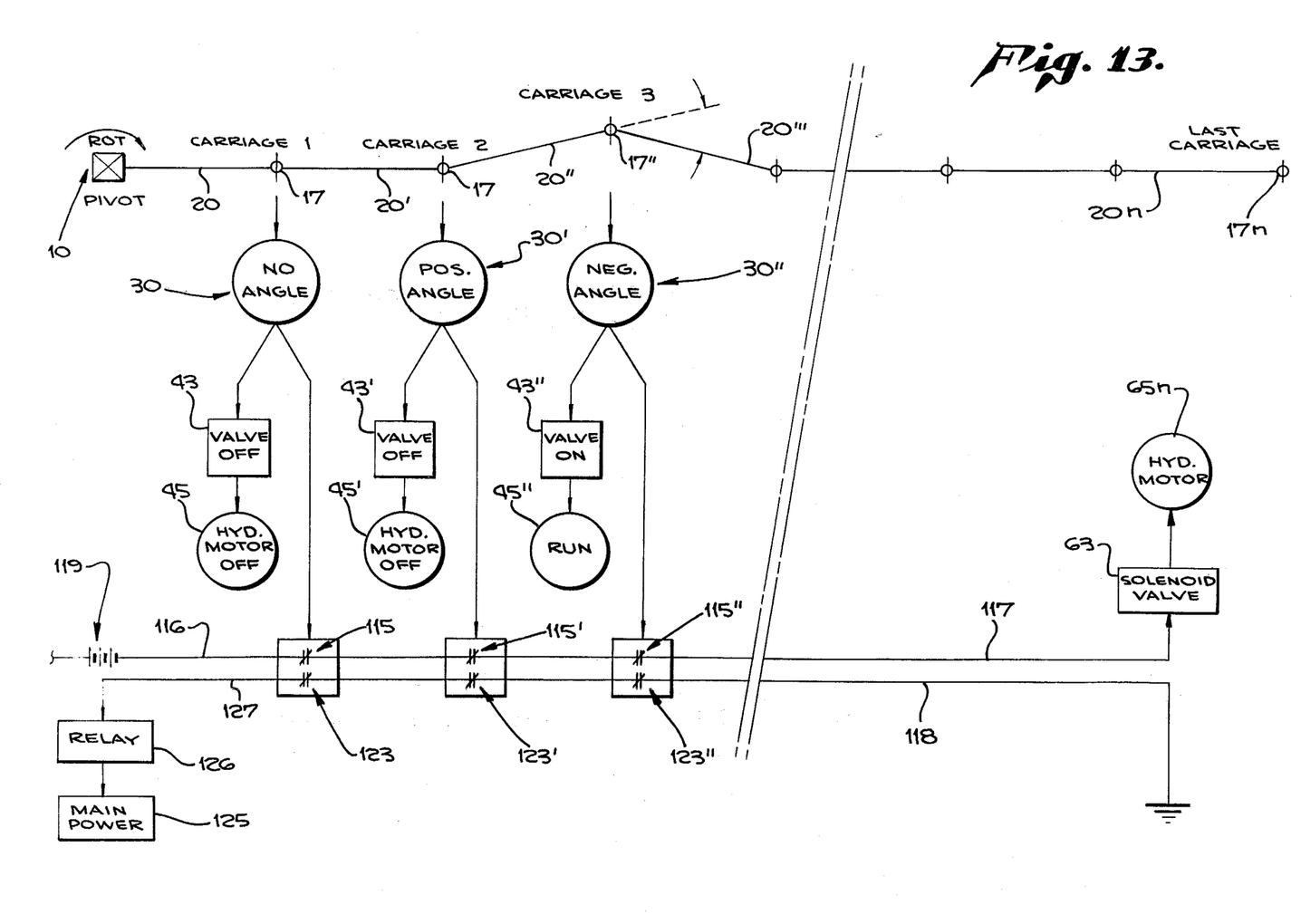
FIG. 13 is a schematic representation of the overall system operation and including an electrical schematic showing electrical circuitry means for turning portions and all of the system on or off as explained in the detailed description following.

The center pivot irrigation system of the present exemplary embodiment is adapted to be run in either direction about the center pivot indicated generally at 10. Assuming its operation initially in a clockwise direction in FIG. 10, a somewhat schematical representation of the system and its component parts is illustrated in FIG. 13 for purposes of explaining the method and apparatus of the present invention. As seen in FIG. 13, a plurality of span units are illustrated schematically with the span units of FIGS. 1 and 2 shown at 20, 20', 20" and 20'" respectively. A last span unit is represented at $20^n$ having a drive carriage $17^n$. When hydraulic fluid is pumped by pump 71 from reservoir 72 into the system of lines 60, 61 intermediate carriage lines L1 and L2 and the end carriage lines 60' and 61" at a variable or selectable value of constant volume fluid flow to produce an average speed for the system about the center pivot. As will be described hereinafter, if any particular span unit gets ahead or behind of its associated adjacent span units, its supply of hydraulic fluid is increased or decreased as is appropriate for bringing it back into the desired alignment. The fluid flow to each carriage's motor means, according to the present invention, is controlled in response to changes in angularity sensed by the aforedescribed angularity sensor means as explained hereinafter.

When hydraulic fluid is pumped at a constant volume flow rate into the hydraulic fluid system of the irrigation system as illustrated in FIG. 12, the span units will rotate in a clockwise direction in FIG. 13. When the control arm 31 of the sensor means, indicated generally at 30, between adjacent span units 20 and 20' senses no angularity change between the units relative to the desired vertical plane in which they are revolving about the center pivot, it will operate control arm 42 to turn the valve means, indicated generally at 43 to an off position thus turning the associated motor means 45 and 45' off. Further, according to the present method and apparatus, if the control arm 31 on the sensor means 30' positioned between the adjacent span units 20' and 20" senses a positive angle, i.e. that span unit 20' is trailing span unit 20", the movement of control arm 31 of sensor means 30' will operate control arm 42 to shut off the associated hydraulic flow valve 43' to turn off the associated hydraulic motor means, as motor 45'. However, should a sensor means, as 30" sense a negative angle between adjacent span units, as shown between span units 20" and 20'" in FIG. 13, the movement of control arm 31 in response thereto will move control rod 42 to turn the associated hydraulic control valve 43" on to run the associated motor means 45". As will be explained hereinafter, the hydraulic valve means 43 for each of the span units hydraulic fluid drive is provided so that as the negative angle increases, indicating a greater lag by the carriage, as 17'" in FIG. 13, hydraulic fluid flow is increased through a further opening of the valve means to cause a speeding up of the associated motor and drive wheels. The construction and operation of an exemplary embodiment of adjustable hydraulic valve suitable for use in the present hydraulic drive system will now be explained.

Figures 5, 6, 7, 8:
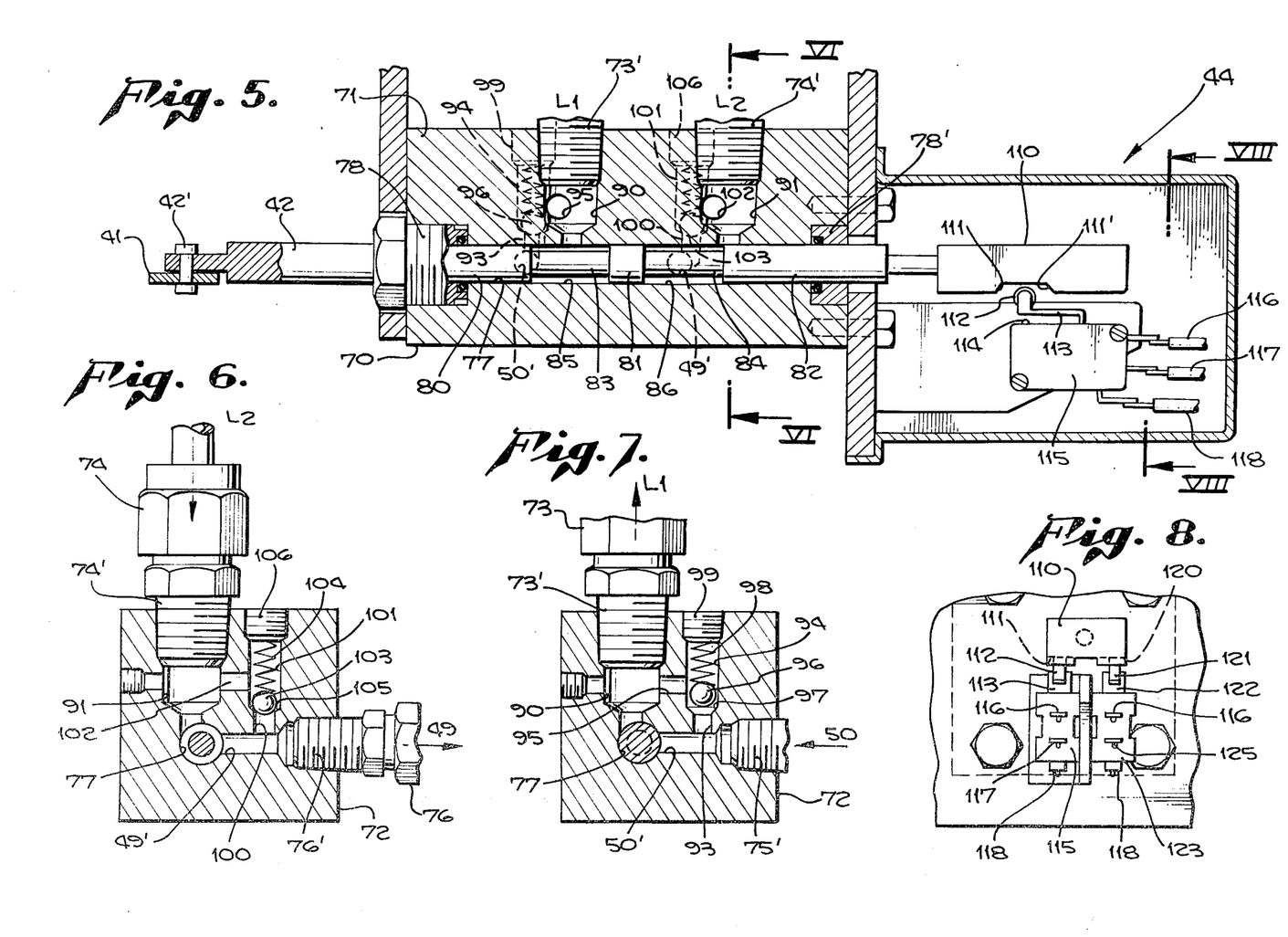
FIG. 5 is a section view taken in FIG. 4 along the plane V—V showing details of a preferred exemplary embodiment of hydraulic fluid valve means and associated electric switch means operated by the angularity sensor means of FIGS. 3 and 4 for controlling operation of the system.
FIG. 6 is a section view of the valve means of FIG. 5 taken therein along the plane VI—VI.
FIG. 7 is a view as in FIG. 6 showing a counterflow of hydraulic fluid to the illustrated valve means.
FIG. 8 is a side view of the switch means of FIG. 5 taken therein along the plane VIII—VIII.

Adjustable hydraulic fluid valve means are provided in the fluid flow lines to each carriage motor means intermediate the center pivot and end carriage motor means for varying the flow of fluid through the associated motor means in response to control by the angularity sensor means provided between adjacent span units as hereinbefore described. In the exemplary embodiment, as seen in FIGS. 4 and 5, the control arm 31 of the exemplary sensor means is connected by pin 42' to the control rod 42 of the exemplary adjustable hydraulic fluid valve indicated generally at 43. As seen in FIGS. 4 & 5 fluid lines L1 and L2, as referred to in FIG. 12, enter the valve means body 70 through an upperside 71 thereof with the fluid lines 49 and 50 to the associated hydraulic motor means coming out a side 72, which is a rear side of the body 70 as viwed in FIG. 5. Lines L1, L2, 49 and 50 are attached to valve body 70 by suitable fittings as shown at 73, 74, 75 and 76 respectively.

Adjustable valve means body 70 is provided with a valve bore 77 which extends transversely through body 70 as seen in FIG. 5. Control rod 42 is mounted by fluid tight end bushings 78 and 78' as seen in FIG. 5 for sliding movement through the valve bore 77 with a rear end portion 79 extending into the housing for the switch means indicated at 44 for purposes explained hereinafter. Piston means are formed integrally of portions of control rod 42 lying within valve bore 77 for controlling the flow of fluids between supply fluid lines L1 and L2 and motor drive circuit lines 49 and 50. Such piston means include piston portions 80, 81, and 82 as seen in FIG. 5. Rod portions 83 and 84 between the piston portions 80, 81 and 82 are of reduced diameter to form piston chambers 85 and 86, respectively. According to the present invention, fluid flow in either direction through lines L1, L2, 49 and 50 is very closely controlled and metered in response to changes in angularity sensed by the sensor control means through the movement of the aforedescribed piston means within bore 77.

A first passage 90 communicates the bore of nipple 73' of fitting 73 through its inner opening to bore 77 while a second passage 91 communicates the bore of nipple 74' through its inner opening to bore 77 to connect fluid lines L1 and L2 to bore 77.

Exhaust passages are provided in the exemplary embodiment of adjustable valve to assure free exhaust flow of fluid from the valve while providing for a close control or metering over the inflow of fluid through either lines L1 and L2 by the associated piston means. Considering first the line L1 and its communication of exhaust fluid from line 50, and referring to FIGS. 5 and 7, it can be seen in FIG. 7 that the bore of nipple 75' of fitting 75 communicates with a passage 50' which is an extension of line 50 within valve body 70 to bore 77. An exhaust flow passage to line L1 is provided by a passage 93, bore 94, passage 95, first passage 90, and fitting 73 to line L1. As noted in FIG. 12, fluid flow is from valve 43 through line L1 back to the power source as indicated by the arrows in FIG. 7. A one-way check valve is provided in bore 90 by ball 96 which is biased toward the associated seat 97 by spring 98. Plug 99 holds the ball and spring assembly within bore 94 urging the ball against seat 97 to normally close this first exhaust passage against fluid flow into bore 77 but allowing flow from line 50 to line L1 bypassing valve bore 77.

A second one-way exhaust passage is provided in association with the lines L2 and 49 through valve body 70 as seen in FIGS. 5 and 6 which is constructed as aforedescribed with regard to lines 50 and L1.

As seen in FIG. 6, fluid flow from line L2, supplied from the power source at the center pivot as illustrated in FIG. 12, flows into bore 77 via inlet 91 and out through internal passage 49', the bore of nipple 76' of fitting 76 and to line 49. In the event of a reversal of flow through the valve body, fluid flow from line 49 may enter internal passage 49' and pass through the second one way exhaust passage provided by passage 100, bore 101 and passage 102 communicating with passage 91, which in turn passes through the inner bores of fitting members 74 and 74' to line L2. One way check valve means are provided in bore 101, as in bore 94, comprising a ball check member 103 shown seated by its spring 104 against seat 105 formed between bore 101 and passage 100. Plug 106 maintains the passage 101 closed and the ball and spring in assembled operative relation normally closing the passage to the influx of fluid from L2 to bore 77, to be metered therethrough by the piston means but allowing for a free flow past the piston means and bore 77 in the event of a reversal of fluid flow through the valve means.

Assuming fluid flow at a constant volume flow rate from pump 71 through lines 60", valve 66 and line 61 through flow restrictor 107 (to limit flow to a maximum rate) for the various lines L2 of the intermediate carriages to drive the irrigation system in a clockwise direction about the center pivot in FIGS. 2 and 13, and assuming the sensor means to sense a slight negative angle deviation between adjacent span units 20 and 20' as aforedescribed, the associated valve is in an on position wherein fluid flow flows through line L2, passage 91, chamber 86, passage 49' and fitting 76 to line 49 to the associated hydraulic motor means 45 and then returns through line 50, fitting 75, passage 50', passage 93, bore 94 (past ball check 96) passage 95, passage 90, fitting 73 and line L1 to main fluid line 60 and back through reversing valve 66, line 79, separator 78, line 79' and line 73 to reservoir 72. A very close control or metering of this fluid flow is provided by the valve construction of the present invention by adjusting the position of piston portion 82 relative to inlet passage 91. As shown in FIG. 5, a small rate of flow is being provided through passage 91 causing a forward movement of the associated carriage wheels. Remembering that FIG. 4 is a bottom view, and that travel of the system is in an upward direction in FIG. 4 when viewed from below, if travel of span unit 20' tends to get ahead of span unit 20, the sensor sensing a negative angle therebetween (as illustrated in FIG. 13 between the units 20" and 20''') control rod 42 is pushed inwardly of valve body 70 moving piston member 82 off of inlet portion 91 allowing increased fluid flow through chamber 86 to port 49' to line 49 and the motor means of the carriage associated therewith. As span unit 20 lags increasingly behind its adjacent unit 20', rod 42 will be pressed an additional, increasing amount into the valve body 70 opening inlet passage 91 in increasing amounts to increase the flow rate of fluid to the associated carriage motor means to speed up the carriage until it reaches a catch up position. As the span unit 20 catches up to the adjacent span unit 20', control rod 42 will be withdrawn by arm 31 to adjustably restrict fluid flow to the associated carriage motor. As indicated in FIG. 13 schematically, the present valve construction, in association with the angularity sensor means as aforedescribed, provides for closing off the drive of fluid from line L2 to line 49 in the event that the span unit, as unit 20 is in alignment with the adjacent span unit or is ahead of it.

Means are provided for turning the end span unit motor means off in the event that a full opening of passage 91 to motor line port 49' fails to cause span unit 20 to catch up. As seen in FIG. 5 a cam 110 is mounted on the rear end 79 of control rod 42. On movement of rod 42 to the right in FIG. 5, cam surface 111 is brought into engagement with cam follower 112 as valve inlet passage 91 is increasingly opened until follower 112 is cammed by surface 111 to bring switch arm 113 into engagement and depress actuator button 114 of switch arm 113 into engagement and depress actuator button 114 of switch 115 as seen in FIG. 5. A switch means 115 is provided in association with each span unit 20, 20' and 20", as represented in FIG. 13, as well as the remaining units except for the last or end span unit $20^n$. On closing switch 115, an electric circuit from a source, indicated generally at 119, is closed through lines 116 and 117 to the solenoid 63 of valve 62 in FIG. 12 shutting off the hydraulic fluid flow to hydraulic motor $65^n$ and thus stopping the end carriage.

Figure 9:
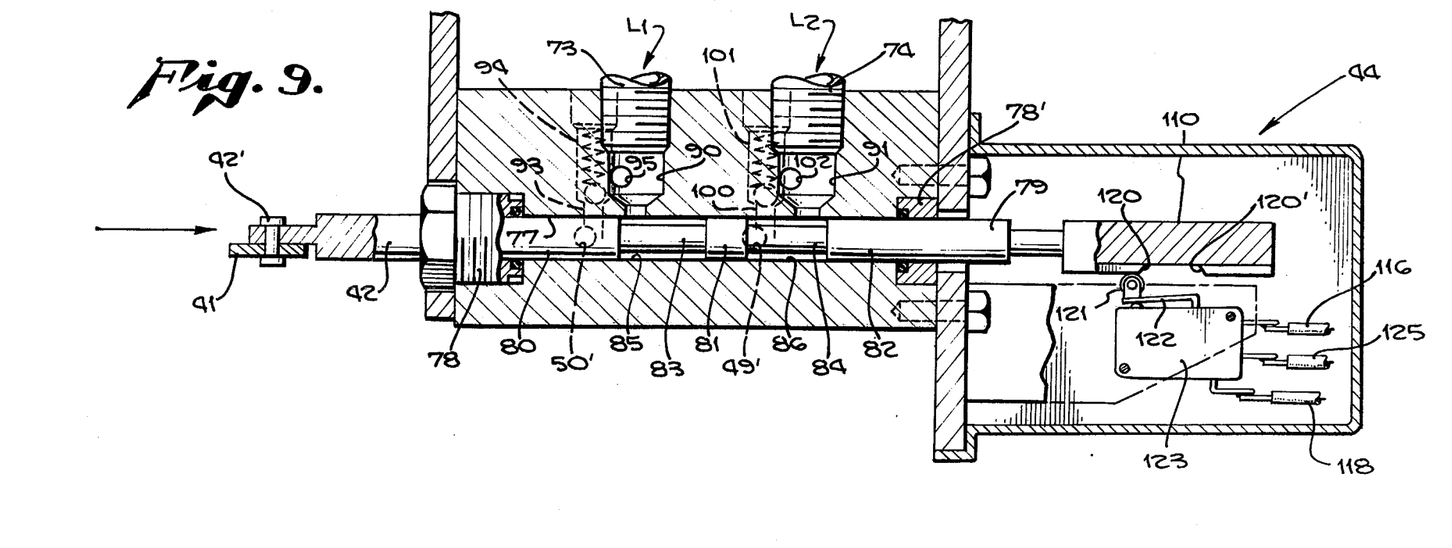
FIG. 9 is a view as in FIG. 5 showing the valve and switch means having been operated by the angularity sensor means.

In the event that unit 20 lags even further behind its adjacent span unit, then further travel of control rod 42 to the right in FIG. 9 will cause the second cam surface 120 of cam 110 to engage cam follower 121 of the second switch arm 122 operating the associated switch 123 to turn off the main power source 125 for the pump 71 via relay 126 operated by the electrical circuit including line 127 running from each of the associated switch means 123, 123', 123" et seq.

In the event that it is desired to operate the irrigation system in the opposite direction to that discussed hereinbefore, i.e. counterclockwise in FIGS. 2 and 13, the reversing valve 66 in the hydraulic fluid system of FIG. 12 may be reversed through the actuation of solenoid 67 by suitable control means to place the valve body portion 68 in communication with lines 60 and 61, thus reversing the fluid flow. The reversal of fluid flow will then be through line L1 valve 43, line 50, the associated motor means 45, 45', line 49, valve 43 and return through line L2. Adjustable valve 43, according to the present invention, is constructed to accommodate this reverse flow of hydraulic fluid through it and to continue to closely control or meter the fluid flow to the hydraulic motor means 45, 45' in order to operate the system in the reverse direction with the individual span units motor means being selectively supplied with the proportion of the constant volume of hydraulic fluid being supplied to the system as is required to maintain it in general alignment with the other units of the system. In running in the opposite or counterclockwise direction in FIGS. 2 and 3, the tendency of a span unit to lag behind the associated adjacent span unit will cause the control arm of the associated sensor means 31 to withdraw control rod 42 from adjustable valve body 70 in a manner illustrated in FIG. 10. Fluid flow from line L1 enters through fitting nipple 73' into passage 90 through chamber 83 to the outlet passage 50', fitting 75 and motor fluid line 50 in the reverse direction as shown in FIG. 12 to the motor means 45 and 45'. Return fluid flowing in line 49 enters valve means 43 via fitting 76 to passage 49' (in FIG. 6) through return passage 100, past ball check 105 and through passage 101, passage 102, passage 91, fitting 74 and then to line L2 in the reverse direction back to the reservoir, bypassing the piston means and valve bore 77 as was the case with return flow in the opposite direction when explained with regard to the direction of fluid flow illustrated in FIG. 7. On reverse of fluid flow through the valve body, the flow of fluid and the positioning of the components of FIGS. 6 and 7 is merely reversed. Importantly, the metering of fluid flow through now inlet passage 90 in FIG. 10 is closely controlled by the piston means portion 80 metering flow from passage 90 and chamber 83 at the exit to outlet 50'. As before, and increased lag of the span unit 20 relative to its adjacent unit will cause piston means 80 to move to open outlet 50' in increasing amounts causing an increase in fluid flow to its associated motor means and thus a speeding up of the unit. In the event that the unit gets too far behind its adjacent unit, then cam 110 is moved in the opposite direction to that illustrated in FIG. 5 to bring cam portion 111' in contact with follower 112 to operate switch 115 to turn off the end span unit motor means as aforedescribed. On a still further lagging of the span unit behind its adjacent unit, then cam surface 120' actuates cam follower 121 to actuate the associated switch 123 to turn off the power to the hydraulic power source, pump 71, to close down the system.

As can be seen from the foregoing, the present invention in methods and apparatus for operating a center pivot irrigation system achieves the aforestated objects and has the advantages of producing a selectable value of constant speed of rotation of the irrigation system about its center pivot through the utilization of a relatively low pressure constant volume flow rate of hydraulic fluid for operating the system. By pumping a known volume of hydraulic fluid through the system during a given time period, the system will produce an average speed of rotation about its center pivot, although individual span units may go faster or slower than others. In the event an individual span unit encounters rough terrain causing it to lag behind its predetermined position relative to the other span units, the system automatically concentrates the hydraulic fluid supply to the lagging span unit thus increasing the pressure available to operate such units associated motor means in increasing amounts as that unit tends to lag the others. It is possible that all of the span units but a single lagging unit could be effectively stopped while the entire system pressure was applied to the laggging unit. However, even if some units stop, the average or net speed for the system around the center pivot will be substantially constant as long as a constant volume of fluid is pumped through the system.

Through the provision of the novel adjustable valve means of the present invention, the flow of hydraulic fluid to each of the span unit motor means can be very closely metered by the associated two directional angularity sensing means disclosed for very accurately controlling the position of the span units relative a leading end span unit regardless of the direction of fluid flow for the hydraulic fluid through the system. A fairly shallow curve may be determined for the otherwise substantially linear array of units extending from the center pivot to the end leading span unit in a given direction of travel and be maintained should the system be reversed to travel in the opposite direction.

Having thus disclosed and described a preferred exemplary embodiment of the present inventions in method and apparatus of operating a center pivot irrigation system through a hydraulic drive means employing a selectable value of constant volume fluid flow through the system and means for controlling the distribution of that fluid to the individual motor means of individual span units, it should be understood by those skilled in the art that various modifications, adaptations and equivalent embodiments thereof may be made within the scope of the present invention which is defined by the following claims.

We claim:

1. In a center pivot irrigation system revolving about a center pivot having a plurality of articulated span units each including a drive carriage adjacent one end having a hydraulically driven motor for operating associated carriage wheels at a speed directly proportional to the rate of hydraulic fluid passing therethrough wherein the motors are connected in parallel between a supply line and a return line of a pressurized hydraulic fluid source, the improved method of operation with low pressures and low volumes of circulating hydraulic fluid comprising the steps of:

(a) operating the hydraulic fluid source to circulate only a preselected constant volume of hydraulic fluid per unit time through the supply and return line such as will produce a preselected net lineal distance travelled of all the drive carriages about the center pivot; and, (b) controlling the distribution of said constant volume of fluid being circulated to the individual motors of all span units except the one furthest from the center pivot by means of individual valve means connected to individually control the flow of hydraulic fluid to each motor as a function of angular deviations between adjacent span units such that the supply of fluid to the motor of any such controlled span unit which is ahead of or even with a position of preselected alignment with the adjacent span units is reduced in any ever increasing amount as such unit gets further ahead, the supply of fluid to the motor of any span unit which is lagging behind such position is increased in an ever increasing amount as the amount of lag increases, and all fluid not used in the other span units is used to drive the motor of the span unit furthest from the center pivot whereby a preselected net travel of the system about the center pivot per unit time is maintained.

2. The method of operating a hydraulically driven center pivot irrigation system as claimed in claim 1 and including the additional step of:

turning off the supply of fluid to the span unit furthest from the center pivot as long as any one other span unit is lagging behind its proper positional alignment by more than a first preselected amount.

3. The method of operating a hydraulically driven center pivot irrigation system as claimed in claim 2 and including the additional step of:

turning off the supply of fluid to the system when any one span unit lags behind its proper positional alignment by more than a second preselected amount.

4. In a center pivot irrigation system revolving about a center pivot having a plurality of articulated span units each including a drive carriage adjacent one end having a hydraulically driven motor for operating associated carriage wheels at a speed directly proportional to the rate of hydraulic fluid passing therethrough, the improvement comprising:

(a) a pumping system having a fluid supply line and a fluid return line with the hydraulic motors of all the span units connected in parallel therebetween and including a pump adapted to circulate only a preselected constant volume of hydraulic fluid between said supply and return lines through the motors such as will produce the same preselected net lineal distance travelled of all the drive carriages about the center pivot when operably connected to one or more of the motors;

(b) a plurality of angularity sensors disposed to sense the angularity deviation of respective ones of the span units from preselected alignment with adjacent ones of the span units, said angularity sensors each including first switch means operable at a first position of angular deviation and second switch means operable at a second position of angular deviation, said second switch means being operably connected to control the power to said pump whereby when any one of said angularity sensors reaches said second position of angular deviation the power to said pump is disconnected;

(c) a plurality of portioning valves operably connected in-line with respective ones of the hydraulic motors except for the hydraulic motor of the last span unit from the center pivot to control the flow of fluid through said respective ones of the hydraulic motors from said supply line to said return line, respective ones of said valves being operably connected to respective ones of said angularity sensors to be positioned thereby such that the supply of fluid to the motor of any such control span unit which is ahead of or even with a position of preselected alignment with the adjacent span units is reduced in an ever increasing amount as such span unit gets further ahead, the supply of fluid to the motor of any span unit which is lagging behind such position is increased in an ever increasing amount as the amount of lag increases, and all fluid not used in the other span units is used to drive the motor of the span unit furthest from the center pivot whereby a preselected net travel of the system about the center pivot per unit time is maintained; and, (d) an electrically operated on/off valve operably connected in-line with the hydraulic motor of the last span unit from the center pivot to control the flow of fluid therethrough from said supply line to said return line and connected to an electric circuit including all said first switch means whereby the flow of fluid to said last span unit motor is turned off whenever any one span unit lags behind its proper positional alignment an amount greater than said first position of deviation.

5. In a center pivot irrigation system having a plurality of interconnected span units supporting conduit sections and each having a drive carriage including hydraulically driven motor means for operating associated carriage wheels, the improvement comprising:

(a) pump means for supplying hydraulic fluid in selectable constant volume flow rates from a reservoir thereof to said system;

(b) hydraulic fluid line means for connecting said pump means to each of said carriage hydraulically driven motor means;

(c) angularity sensor means connected between adjacent span units for sensing changes in angularity in forward and backwards directions relative to the direction of radial travel of said units about a system center pivot;

(d) adjustable valve means in said line means for each of said carriage motor means intermediate the center pivot and an end carriage motor means for varying the flow of fluid through the associated motor means, said valve means being adapted for closely controlling the volume of fluid flow in either direction through said valve means by comprising a valve body having a valve bore, first and second fluid passages each having end openings to said bore and connected into said hydraulic fluid line means, first and second one-way exhaust passages each having end openings to said bore, check valve means preventing fluid flow towards said bore, and opposite ends opening to said first and second fluid passages respectively, and piston means in said bore and operated by the associated angularity sensor means for selectively metering fluid flow from either of said fluid passages into said bore while allowing free exhaust through the respective exhaust passage associated with the fluid passage not being metered whereby fluid flow may be metered in either flow direction through said valve body; and, (e) valve control means for each said carriage motor means connected to the associated sensor means for operating each said associated valve means for varying the flow of hydraulic fluid therethrough in response to changes in angularity sensed by said angularity sensor means forward or backward of said units whereby the speed of rotation of said system is controllable by maintaining a selectable given rate of fluid flow through said system and an alignment of said units is maintained by varying the distribution of said hydraulic fluid between the various span unit motor means.

* * * * *